Figure 1:
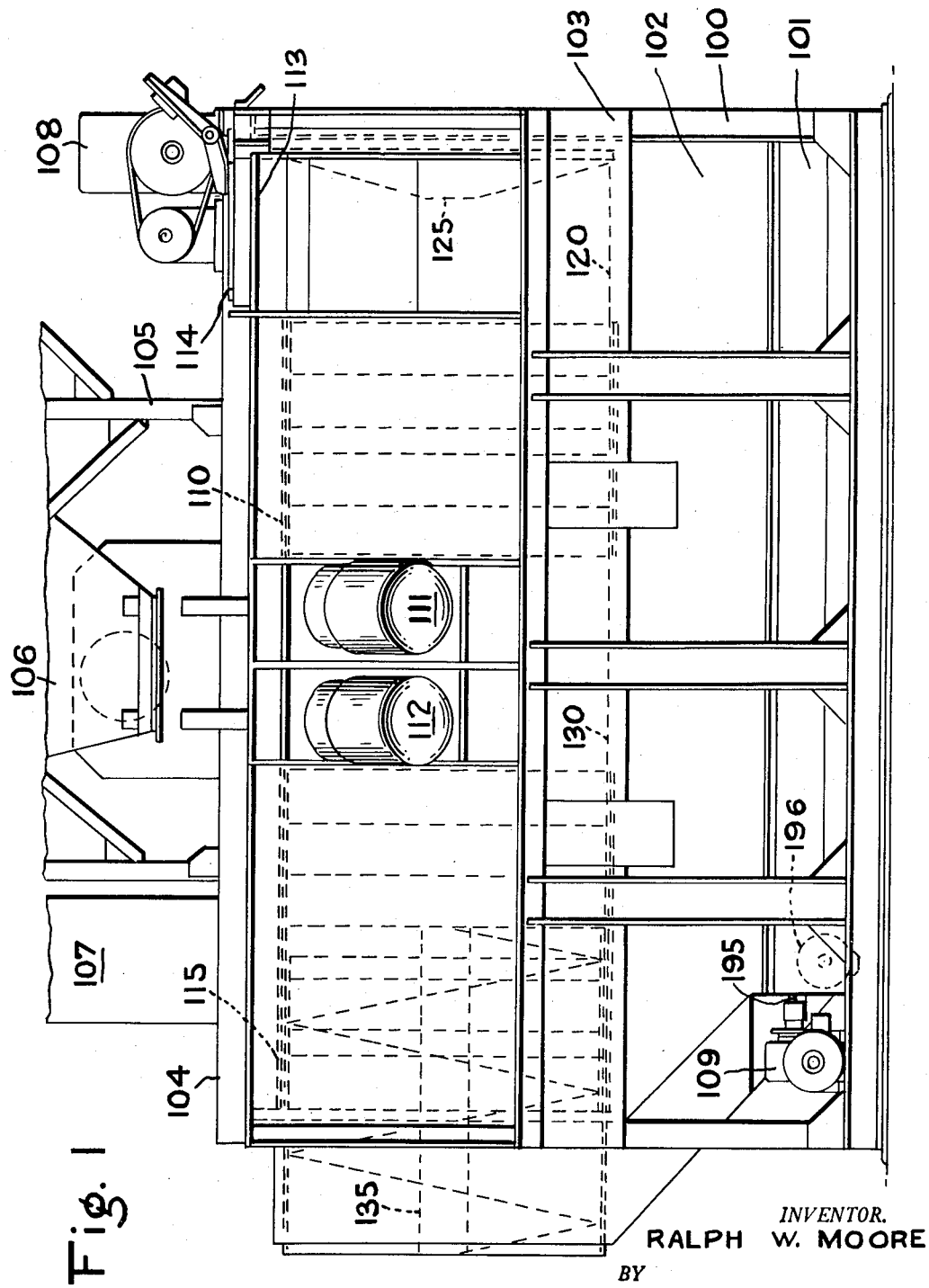

Nov. 29, 1955  R. W. MOORE  2,724,929
WORK BLASTING EQUIPMENT
Filed April 20, 1953  10 Sheets-Sheet 1

INVENTOR.
RALPH W. MOORE
BY

HIS ATTORNEYS

Nov. 29, 1955   R. W. MOORE   2,724,929
WORK BLASTING EQUIPMENT
Filed April 20, 1953   10 Sheets-Sheet 5

INVENTOR.
RALPH W. MOORE
BY

HIS ATTORNEYS

Nov. 29, 1955    R. W. MOORE    2,724,929
WORK BLASTING EQUIPMENT
Filed April 20, 1953    10 Sheets—Sheet 6
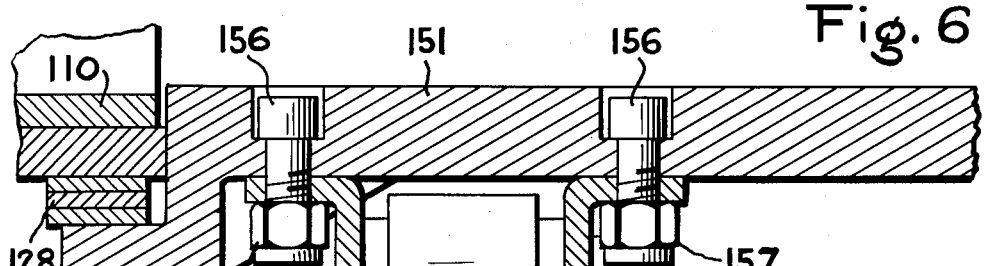
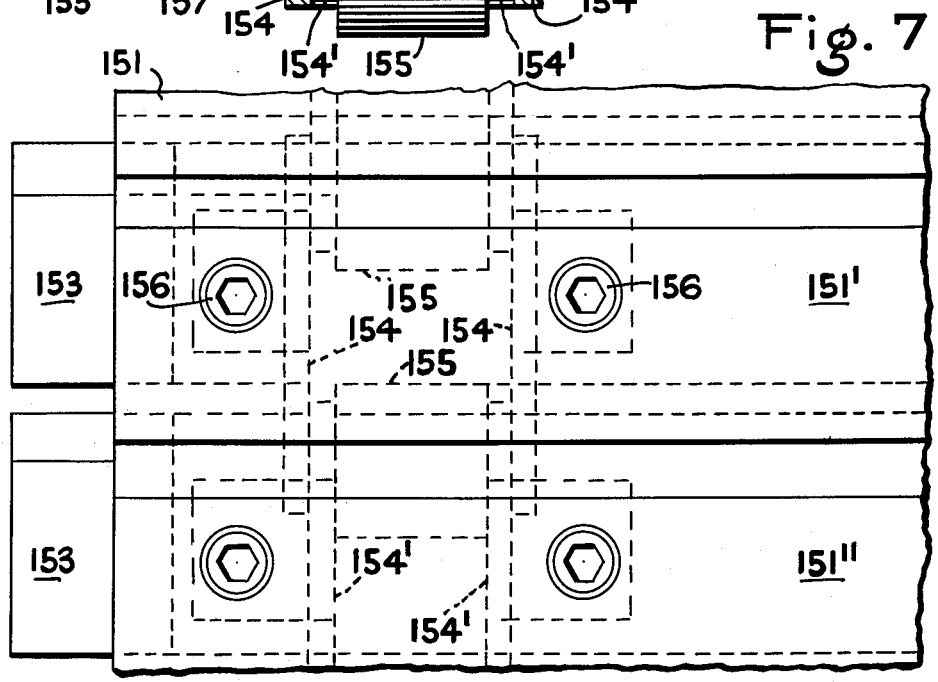
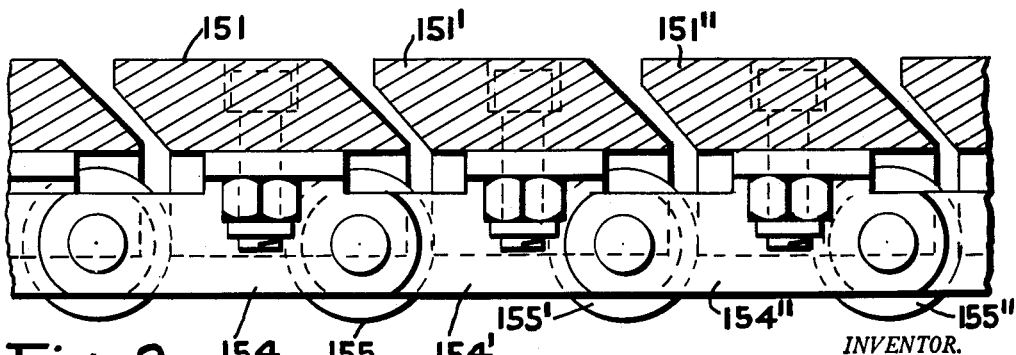
INVENTOR.
RALPH W. MOORE
BY
HIS ATTORNEYS Nov. 29, 1955 R. W. MOORE 2,724,929
WORK BLASTING EQUIPMENT
Filed April 20, 1953 10 Sheets—Sheet 7

INVENTOR.
RALPH W. MOORE
BY

HIS ATTORNEYS

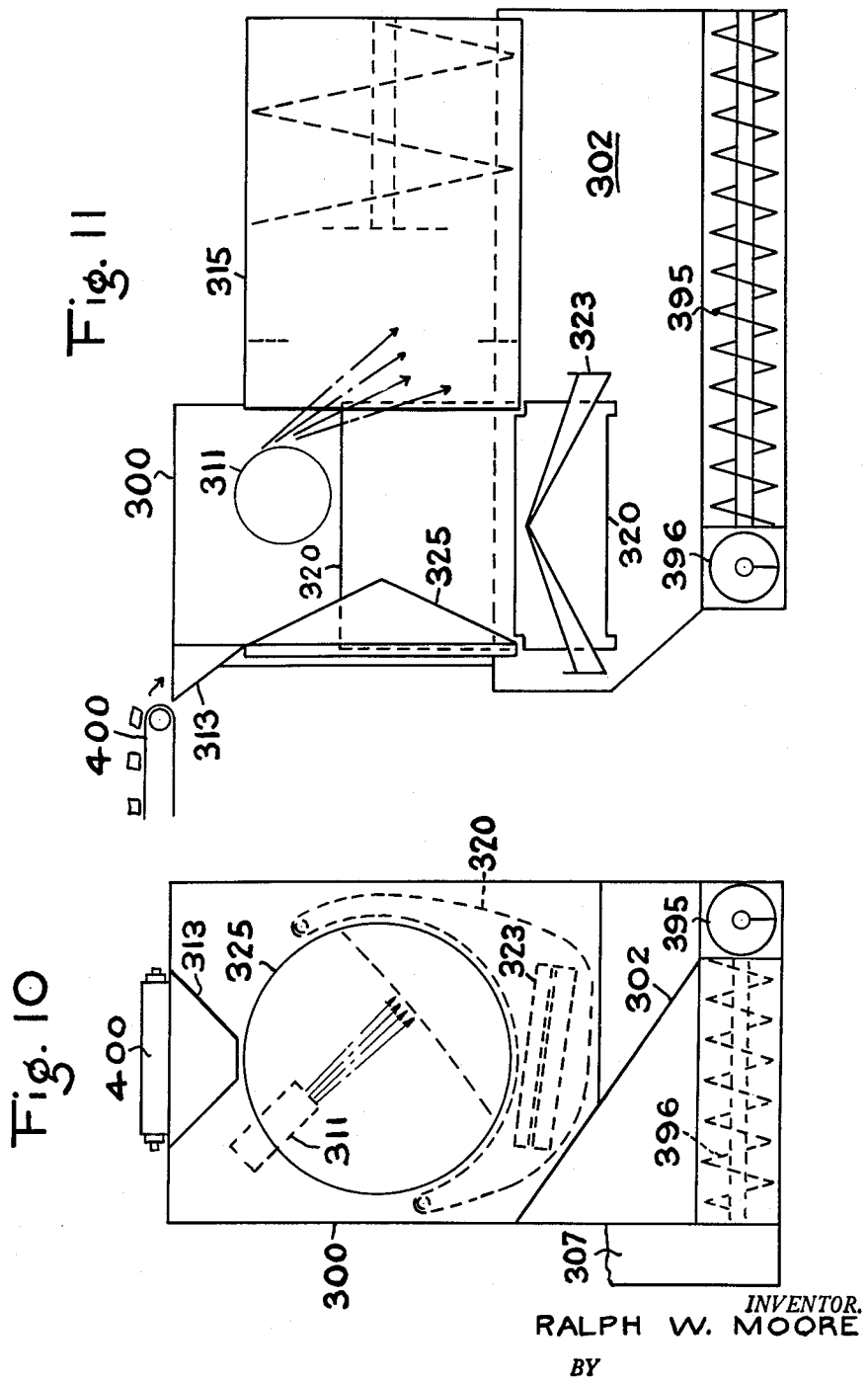

Nov. 29, 1955  R. W. MOORE  2,724,929
WORK BLASTING EQUIPMENT
Filed April 20, 1953  10 Sheets-Sheet 9
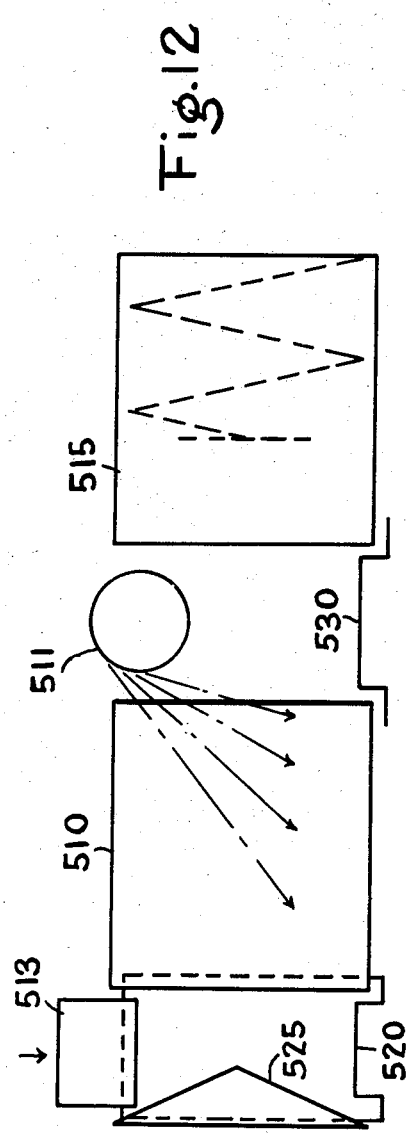
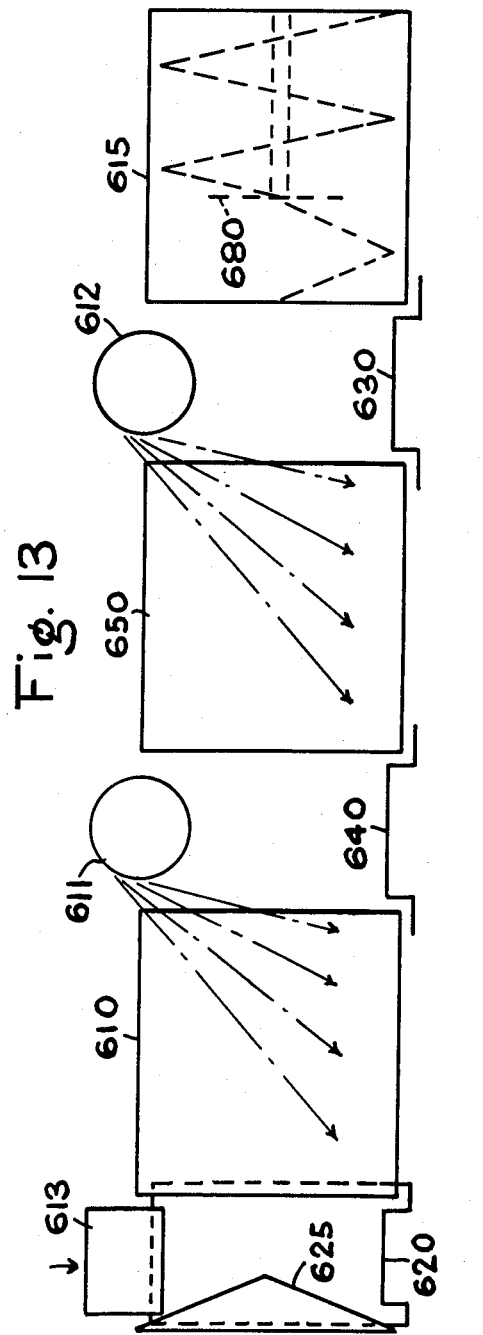
INVENTOR.
RALPH W. MOORE
BY
HIS ATTORNEYS

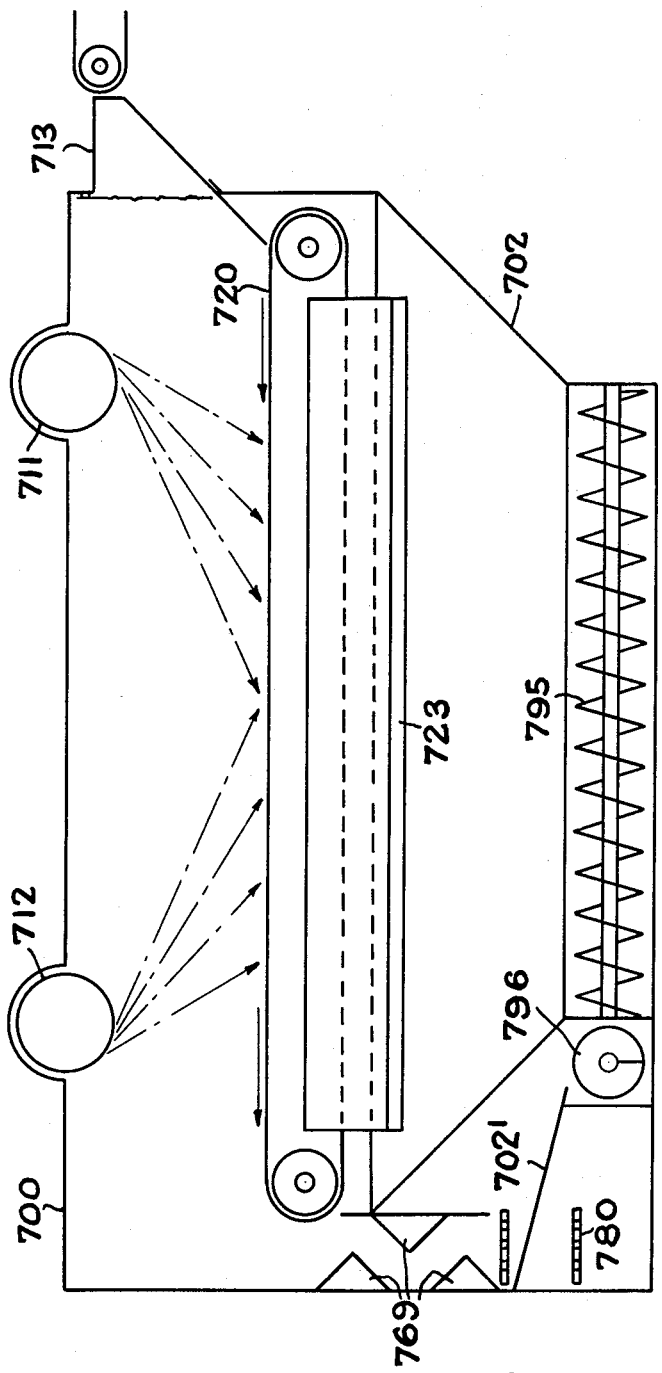

United States Patent Office 2,724,929
Patented Nov. 29, 1955

2,724,929

WORK BLASTING EQUIPMENT

Ralph W. Moore, Hagerstown, Md., assignor to Pangborn Corporation, Hagerstown, Md., a corporation of Maryland Application April 20, 1953, Serial No. 349,663

15 Claims. (Cl. 51—13)

This invention relates to an apparatus for use in the surface treatment of articles and more particularly, to an apparatus for surface cleaning castings, wherein the castings are supplied to one end of the apparatus and are discharged from the opposite end as cleaned articles. More specifically, the invention relates to such type cleaning apparatus which uses plural aligned tumbling barrels wherein, during passage of the articles to be treated through the barrels from the feed end to the discharge end, they are subjected to a stream of abrasive particles, or a plurality of streams thereof while being tumbled in transit.

The present invention is related to that described in prior U. S. Letters Patent No. 2,574,867, issued November 13, 1951, and is directed to an improvement of the structure therein disclosed. In particular, the present invention has for an object, the improved construction of the helicoid end seal member referred to in said prior patent whereby the durability and sealing function of the same is greatly improved. Another object of the present invention is to provide an improved and simplified article feeding chamber or port into which work may be fed in an unorderly and unsupervised fashion and yet be systematically and orderly oriented within the apparatus for passage therethrough, during which the same becomes cleaned in the manner desired. A still further object of the present invention is to provide an improved work article transporting means between and connecting the various cleaning stages of the apparatus. Other and distinct objects will become apparent from the description and claims which follow.

One of the paramount advantages which is inherent in the subject matter of the invention resides in the use of two separate blastant or abrasive streams and means for operating the same in combination with only two tumbling barrels, as distinguished from prior constructions which required at least three tumbling barrels. A further advantage residing in the subject matter of the instant invention is the particular structural arrangement utilized, whereby the separate blastant or abrasive streams may be directed in relatively opposite directions upon the work articles as they proceed through the apparatus; i. e., one abrasive stream may treat the front face of the work as it advances toward and through the abrasive stream, while the second abrasive stream may treat the rear face of the work as it progresses through and away from the second abrasive stream. This latter innovation has a remarkable effect in enhancing the cleaning and surface treating action which is experienced by the work during one passage through the apparatus.

A preferred form of the invention comprises a series of tumbling barrels which are arranged in spaced axial alignment in combination with a pair of abrasive throwing wheels arranged in side-by-side relationship and interposed between said barrels, each wheel being adapted to direct a stream of abrasive particles into a respective barrel section. The apparatus of the invention also includes a novel type work feeding structure positioned in alignment with one said barrel, and which comprises an articulated, endless chain forming a continuously moving support or platform at one end of said barrel, and a deflector end plate which is so shaped and so positioned with respect to said chain as to cooperate with work articles deposited upon said chain and cause the same to be moved laterally thereof during movement of the chain, to be moved into the adjacent tumbling barrel. A similar type articulated chain conveyor structure is also provided intermediate the two said barrel sections in the region underlying the abrasive throwing wheels and which is adapted to transfer the work articles from one barrel section after treatment therein to the second barrel section for a subsequent like treatment. This second barrel section is formed to have a suitable discharge end through which the finished articles may be continuously removed, in combination with an improved helicoid seal of the type described in said prior patent and which is arranged coaxially in the second barrel for rotation therewith, the helix providing a barrier across the full cross-sectional area of the second tumbling barrel, whereby detritus and flying abrasive particles become arrested within the second barrel and separated from the work articles prior to discharge of the latter.

A still further advantage of the present invention resides in the provision of an annular baffle member in one of the tumbling barrels whereby the work which is fed to such barrel enters the same while traveling an inclined path towards the floor of the barrel as distinguished from conventional feeding arrangements wherein the work enters and progresses through the barrel along the relatively horizontal mean feed path. In particular, this baffle is arranged in the second barrel section substantially in the center of a normally unobstructed threshold zone between the leading edge of the barrel adjacent the intermediate conveyor and the leading tip of the helicoid end seal whereby the work is caused to pile up in the forward end of the barrel and to be gradually and systematically trickled along an inclined path toward the floor of the barrel laterally toward the helicoid end seal.

Figure 2:
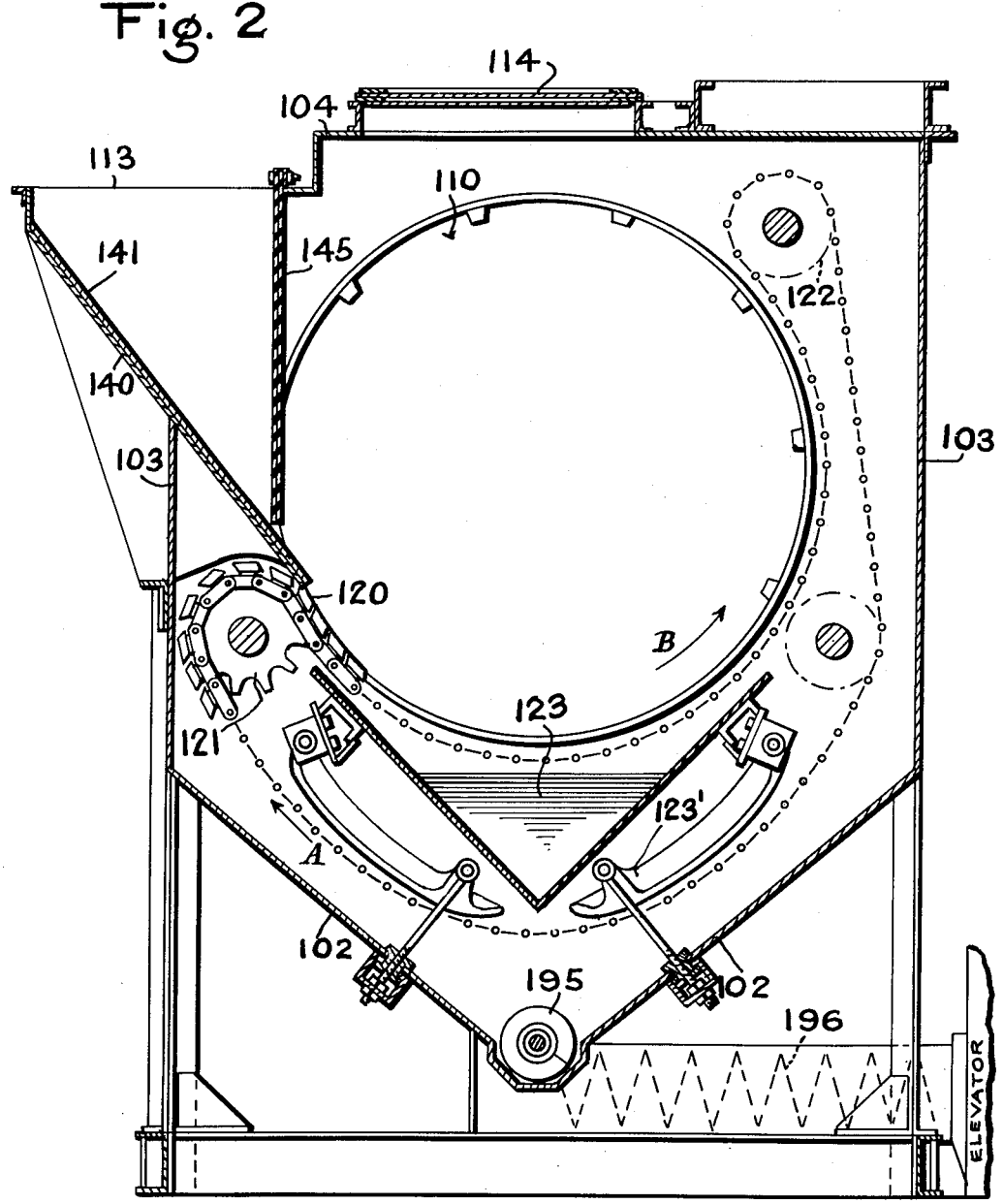
Figure 3:
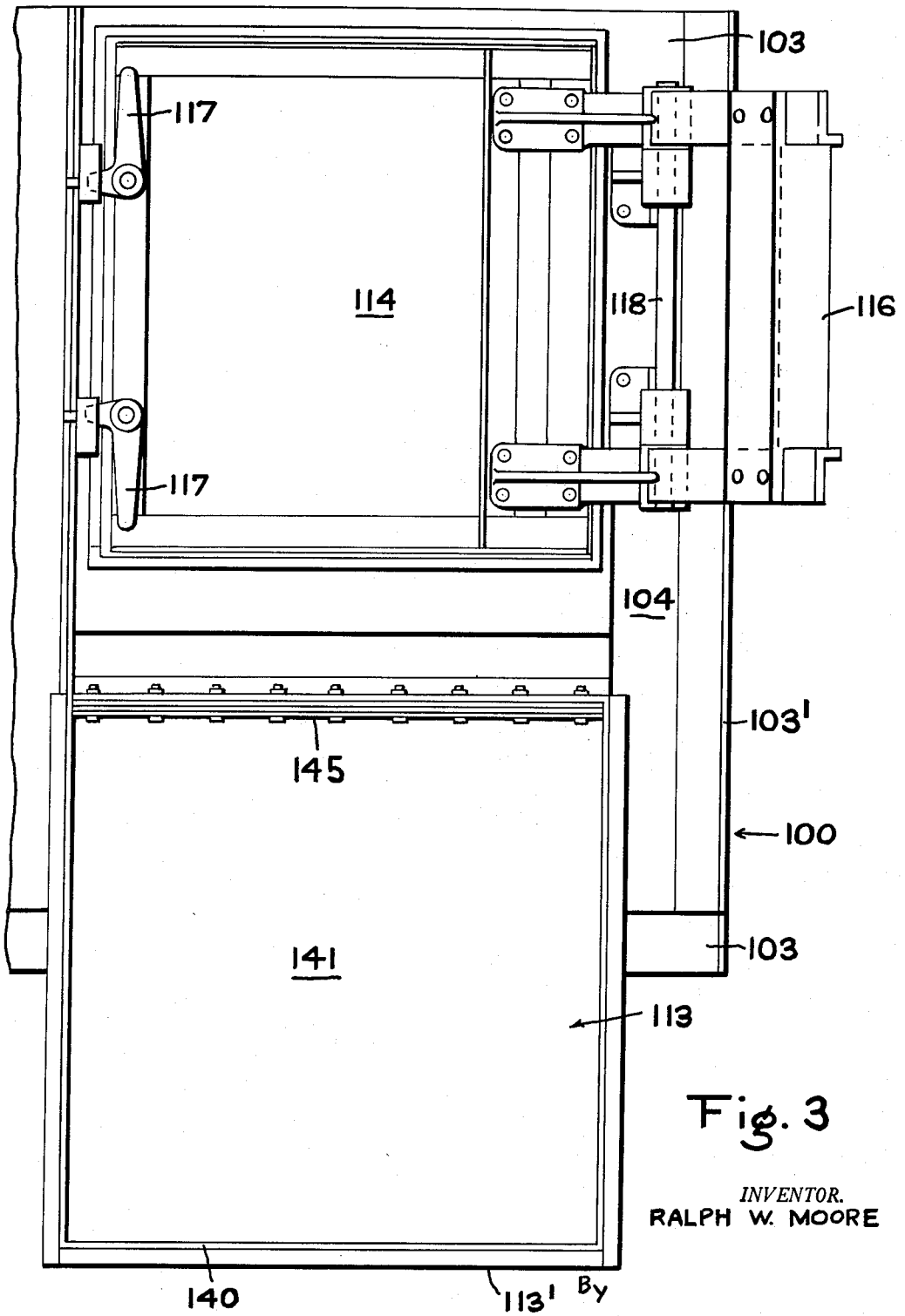
Figure 4:
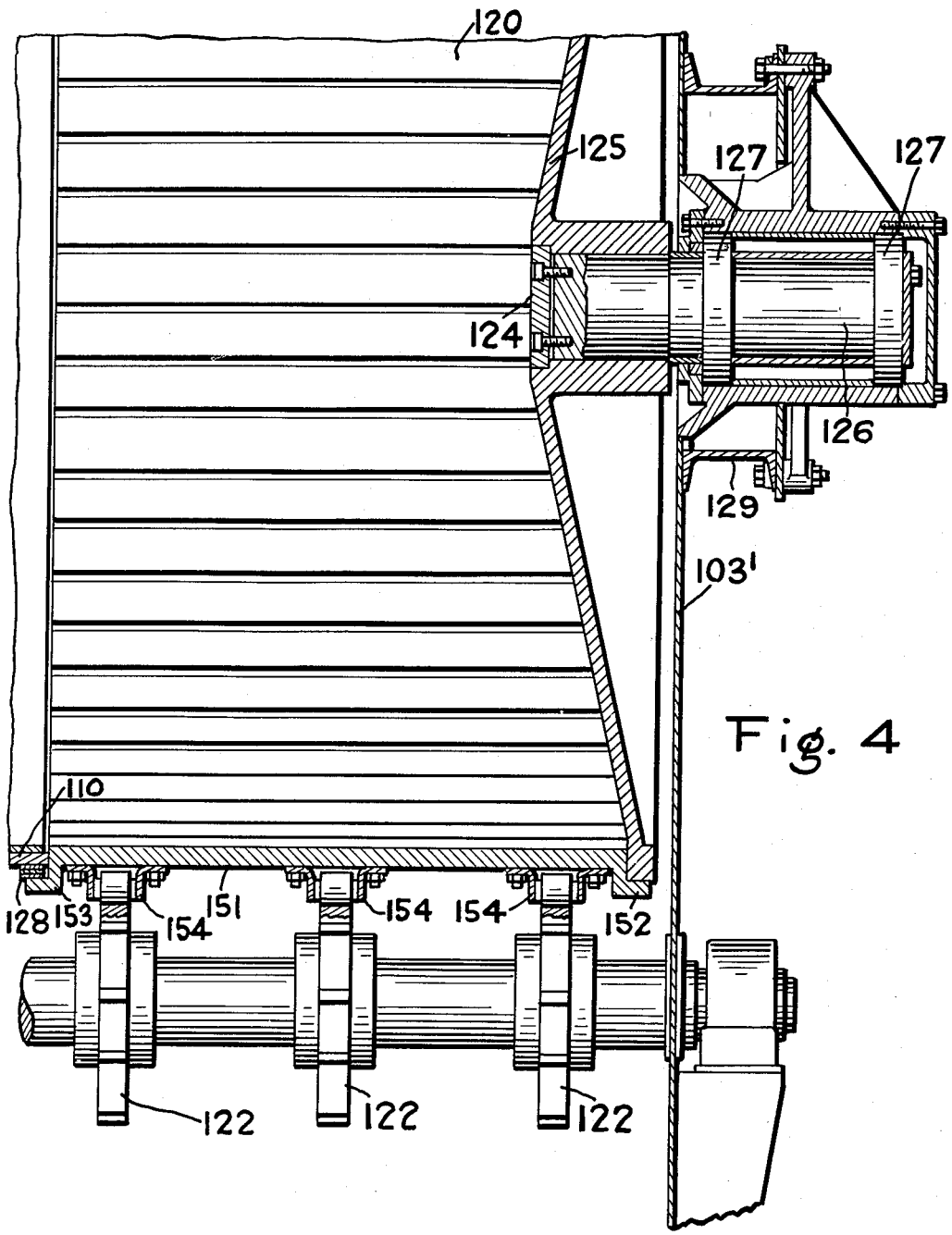
Figure 5:
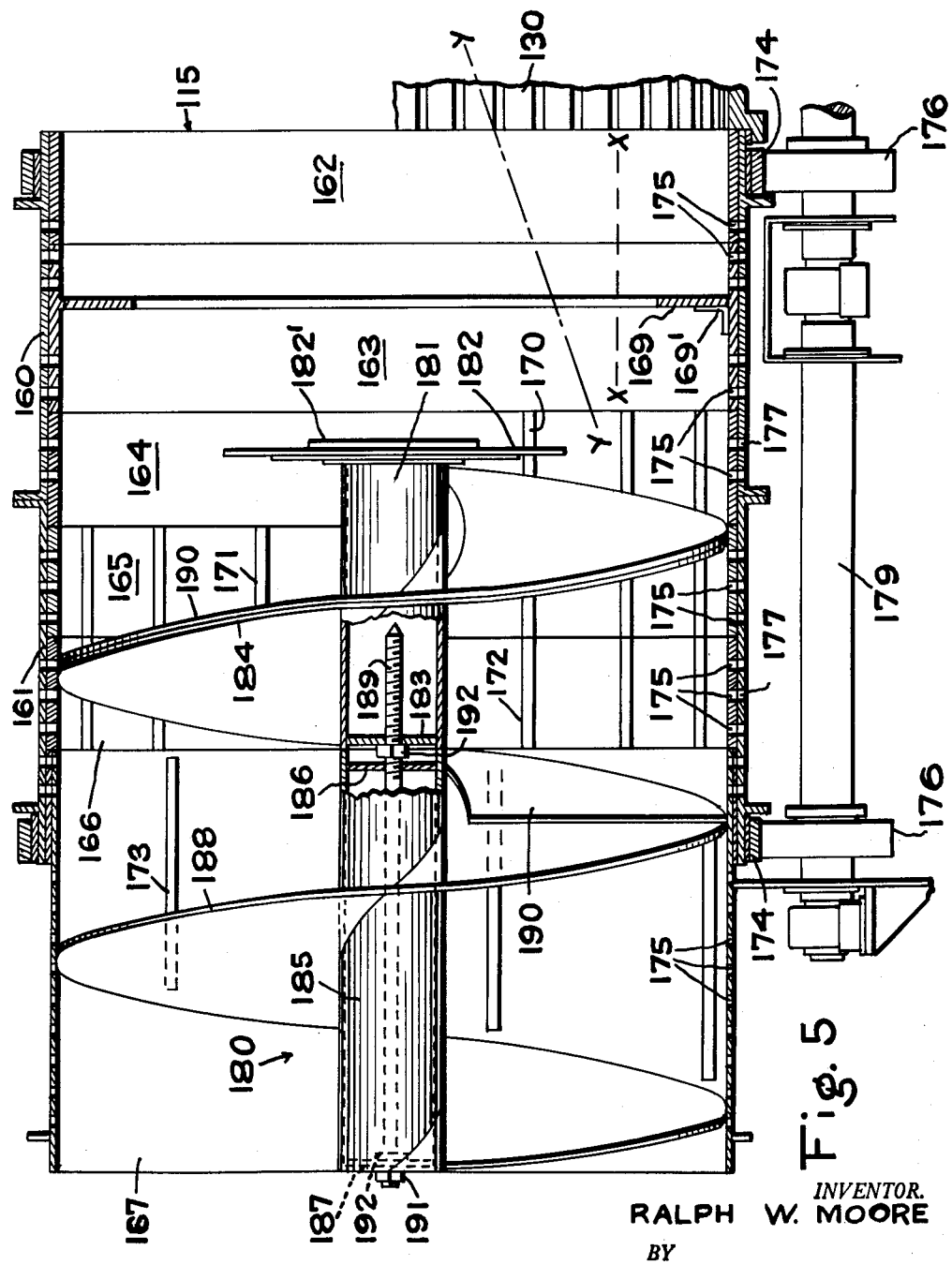
Figure 9:
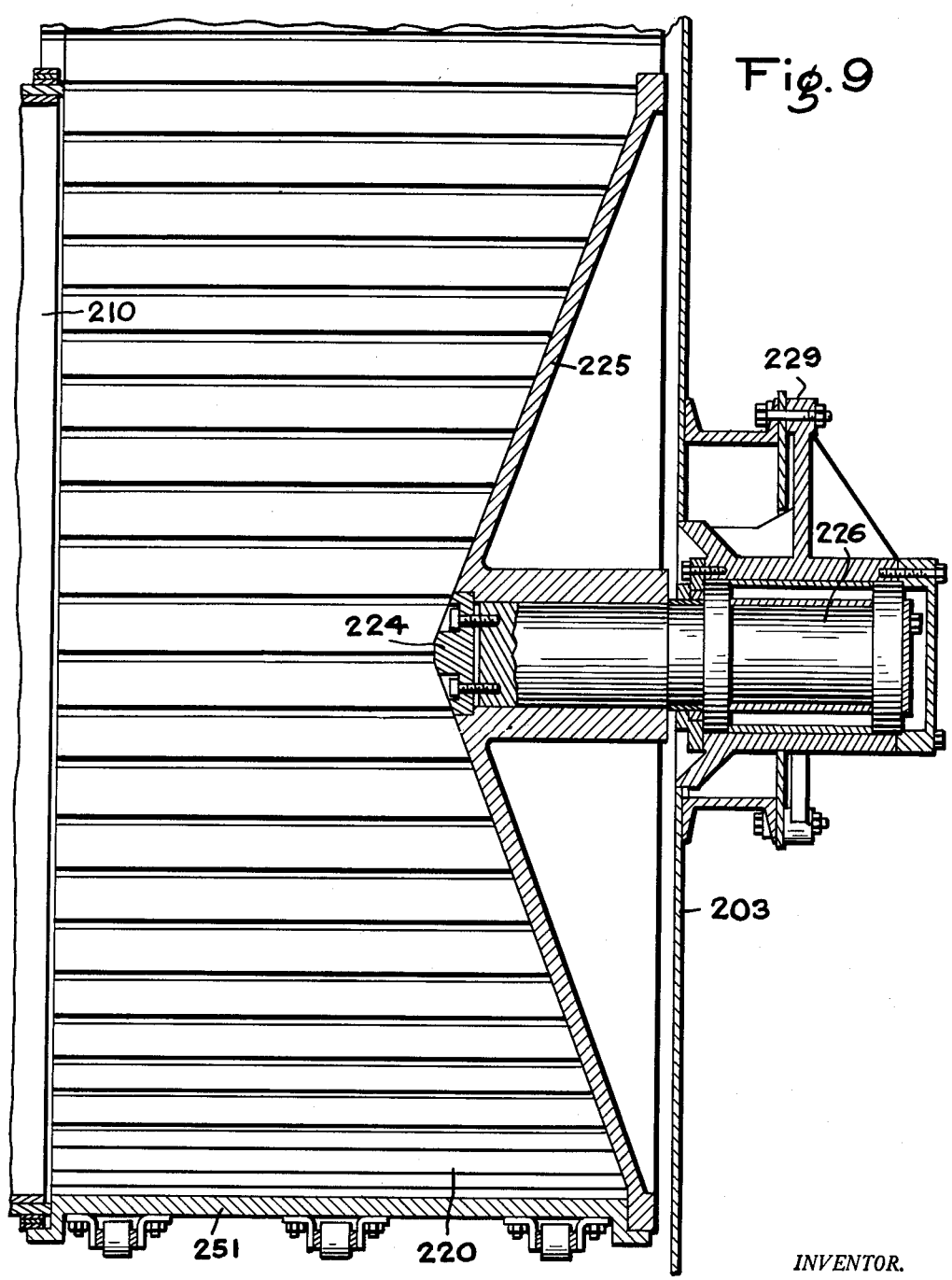

Other advantages and objects of the invention will become apparent from the following description in connection with the accompanying drawings, and in which:

Fig. 1 shows a diagrammatical front view of the apparatus,

Fig. 2 is a sectional view along the line 2—2 of Fig. 1, showing the work feeding structure, Fig. 3 is a top plan view of the feed end of the apparatus, Fig. 4 is a longitudinal sectional view along the center line of the apparatus illustrating the conveyor portion of the work feed structure, Fig. 5 is a longitudinal sectional view along the center line of the apparatus of Fig. 1, illustrating a portion of the second tumbling barrel and the helix seal positioned therein, Figs. 6, 7 and 8 are respective, transverse section, top plan, longitudinal sectional views of the novel conveyor chain of the apparatus, Fig. 9 is a longitudinal section view similar to Fig. 4, illustrating a modified form of the invention, Figs. 10 and 11 are side and end diagrammatic views respectively, of a further modified form of the invention, Figs. 12 and 13 are diagrammatic side views of additional modifications of the invention, and Fig. 14 is a diagrammatic side view of a still further modified form of the invention.

In the illustrated embodiment of the invention, shown more or less diagrammatically in Fig. 1 of the drawings, the apparatus includes a supporting framework 100 upon which is mounted a suitable enclosure housing comprising a lower conveyor section 101, an abrasive and detritus collection section 102, side walls 103, and a top section 104. This housing is adapted to completely or substantially completely enclose the working components of the apparatus as will be more fully understood from the subsequent specific description of the same, and cooperates with a further framework 105 supporting a raised separator structure 106 above the cleaning and tumbling framework 100 in providing a fully automatic unit. Separator 106 forms no part of the present invention and includes conventional type structures for separating, classifying and returning the same to the blasting apparatus after use therein. For this purpose an elevator shaft 107 communicates with the lower portion of the conveyor section of the apparatus housing and is adapted to convey the collected abrasive and debris to separator 106 from a cross conveyor 196 (see Fig. 2).

Framework 100 also supports a motor and speed control unit 108, which is connected to the tumbling and conveyor components of the cleaning apparatus to rotate the same in a desired manner. A second motor 109 is also supported by the framework and is adapted to operate on conventional type screw conveyors located within section 101 of the housing.

Framework 100 and the supported housing enclosure substantially completely surrounds and encloses a pair of spaced tumbling barrel sections, 110 and 115, respectively, which are adapted to receive selected work articles and tumble the same in a blast cleaning action, the direction of travel of the work articles being from barrel section 110 to barrel section 115. The transfer of the work articles between the barrel sections is activated by an endless conveyor type flexible bridging means 130 moving with the barrel sections and spanning the gap therebetween. In accordance with the present invention, the blasting stream of abrasive particles is provided by a pair of abrasive throwing wheels, designated as 111 and 112, and which are located in the gap bridged by flexible means 130. The throwing wheel 111 is adapted to propel blastant particles into the barrel section 110 to impinge upon work articles tumbling therethrough, while throwing wheel 112 is adapted to direct blastant particles into the barrel section 115 to complete the treatment initiated by wheel 111.

In order to feed the work articles to the aligned tumbling barrels in a continuous and substantially automatic manner, a second endless conveyor type flexible bridging means 120, positioned at the righthand end of barrel 110, is adapted to move in predetermined relationship with rotation of the barrel section, and in combination with an end abutment member 125 to direct the work articles axially in the barrel section, the work articles being fed to conveyor 120 and abutment 125 through a port 113 in the top of the enclosure 104. An inspection port 114 is also provided adjacent to loading port 113 to permit periodic inspection of the work as it is fed to barrel section 110.

The construction of the work feeding arrangement will be better understood by reference to Figs. 2, 3 and 4 of the drawings which illustrate the same in greater detail. As shown in Fig. 2, the feed port 113 is formed as a chute-like extension 113' which protrudes outwardly from enclosure sidewall 103 and includes an angularly depending floor 140 which is separated or partitioned off from the central portion of the enclosure by a flexible curtain member 145, which may be made of rubber or the like elastic and easily deformable materials. The flexible curtain member is preferably formed as two independently suspended folds and, if desired, may have the lower portion thereof slit so as to form a fringe through which the work articles may move without causing the entire curtain member to become raised from the floor area of the chute. Preferably, the fringe finger portions of the separate curtain folds are offset with respect to each other to enhance the curtain's shielding action. The floor 140 is also covered with a protective padding 141 which is rubber, or any other elastic-like medium similar to the curtain 145, but which may also be formed of metal, if desired. Curtain 145 serves to prevent the escape of dust, dirt, debris, abrasive particles and the like from within the enclosure housing. Curtain 145 and elastic padding 141 further serve to reduce the noise which is unavoidably encountered during loading of the manual work, such as castings, into the port 115, as well as to slow up the speed of the same.

Positioned directly beneath feed port 113 and chute 140 is an endless conveyor belt 120 of the articulated chain type and which follows an endless path about a portion of the periphery of barrel section 110 which forms a boundary on one side thereof (see Figs. 2 and 4). A cone-shaped end abutment member 125 (see Figs. 1 and 4) forms an end closure member as an opposing boundary. The conveyor 120 is mounted for travel about a pair of sprocket members 121 and 122, as shown in Fig. 2, and serves to collect the work as it is discharged from chute floor 140 and to carry the same across the open mouth of barrel 110 in predetermined synchronous relationship with the rotary movement of the periphery of barrel 110. The construction and direction of movement of the conveyor, as shown by the arrows in Fig. 2, is such that work which becomes deposited upon the articulated links thereof, adjacent to feed chute 140, will be carried around and upwardly in a curved path toward sprocket 122. However, the reverse or ogee curvature of the conveyor belt in the area immediately in front of sprocket 122 prevents the conveyor from carrying the work articles beyond this point due to the influence of gravity; any work article approaching the area of sprocket 122 losing traction on the conveyor surface and either falling downwardly upon baffle 125 to be deflected into barrel section 110, or slide or tumbling down the conveyor into contact with other work articles to be deflected by them into barrel section 110. In order to keep the conveyor reasonably free of abrasive and detritus, an inclined baffle 123 (Fig. 2) is positioned beneath conveyor 120 between end baffle 125 and barrel section 110. Baffle 123 collects the particles which trickle through crevices in the upper working surface of the conveyor and carries them laterally to the side where they are dumped directly onto the screw conveyor 195. The baffle arrangement is supported by a pair of shoe members 123' one on each side of the baffle as illustrated, which are suspended from the inclined floor 102 by adjustable tie rods. The arrangement is such that the tie rods may be individually adjusted to raise and lower shoes 123' and therewith baffle 123, the under-sides of the shoes serving as guiding means for the non-working slack portion of the conveyor belt.

The instant baffle construction has proved particularly effective in increasing the life of the chain conveyor by eliminating excessive wear in the pivotal components of the same. Apparently much of the wear encountered in prior conveyor construction resulted from the fact that particles of abrasive and detritus drop through the open working portions of the upper conveyor span onto the lower slack non-working portions where such become embedded in the bearing areas of the many articulations due to the fact that the slack portion of the conveyor belt is not subjected to the continuous jarring and vibration encountered by the upper working portion thereof. Thus, small abrasive particles and detritus settle upon the lower loop of the conveyor where they work their way into the lubricated pivotal portions of the link construction and became firmly embedded in the same before this portion of the belt comes into contact with the tumbling work articles.

The cooperation between conveyor 120 and barrel section 110 and the cone-shaped end baffle plate 125 is better illustrated in Fig. 4, which shows such components in a longitudinal sectional view along the center line of the apparatus. As illustrated in Fig. 4, the conveyor belt 120 comprises a plurality of link members 151 including opposed, depending flange extensions 152 and 153 which extend into intimate surface engagement with the respective peripheries of the tumbling barrel 110 and cone baffle 125. This arrangement permits the maintenance of a substantial constant alignment between end member 125 and the conveyor and between the conveyor and the barrel, the peripheries of the tumbling barrel 110 and baffle cone 125 providing all the guiding necessary to confine the conveyor to the desired movement path. At the same time, the bearing contact between these components prevents unbalanced loading, excessive wear, and jamming or freezing of the apparatus. Preferably a suitable bearing means 128 is interposed between tumbling barrel 110 and flange 153 to accommodate any speed differential between such elements. The connection between conveyor link flange 152 and baffle cone 125, on the other hand, comprises a loose or running fit which is availed of to rotate the baffle cone in synchronous relationship with the conveyor movement. For this purpose, cone 125 is carried by a stub-shaft 126 mounted for rotation in bearings 127 within a housing 129 projecting outside of end wall 103'. It has been found that the continuous rotation of the baffle member in timed relationship with the conveyor movement greatly increases the effective systematic feeding action of the arrangement.

Each articulated link 151 of the chain conveyor 120 also includes a plurality of drive engaging means (see Figs. 6 through 8 inclusive) comprising a set of opposed dependent hanger brackets 154 supporting idler rollers 155 and suspended beneath the link as by means of recessed bolts 156 and lock nuts 157. As will be more readily apparent from an inspection of Figs. 7 and 8, the depending hanger pairs also function as the articulated member in the chain drive, sequential pairs of the brackets being alternately spaced wider and narrower in the progression of links, thus forming the endless chain. The arrangement is most clearly shown by the sequence of links 151, 151' and 151'' in Figs. 7 and 8 of the drawings.

The arrangement is such that a uniform stock of hanger members 154, rollers 155, bolts 156 and lock nuts 157 will suffice to service various types and sizes of articulated conveyors. Thus, the conveyor 130, which connects tumbling barrel section 110 with tumbling barrel section 115, comprises an endless articulated link conveyor chain substantially identical to the conveyor 120 previously described, with the exception that the link wear pads or section members 151 are approximately ⅓ again as large. This greatly simplifies the manufacture and maintenance of the conveyors.

Access to the interior of the feed section, and from there to the rest of the aligned components, may be gained through a pivoted hatch cover 114 (see Figs. 1 and 3). Cover 114 is adapted to enclose a second portway on the top of 104 of the housing enclosure alongside of feed port 113. To facilitate opening and closing the inspection port, or hatchway, cover 114 is locked in its closed position by dogs 117 and counterbalanced to turn about a pivot axle 118 by a counterweight 116.

After the work articles have proceeded from conveyor 120 to the baffle cone 125 laterally into the mouth of tumbling barrel 110, they are tumbled and surface treated within such barrel under the combined effects of the conventional cleaning structure carried by the barrel and the abrasive stream directed into the barrel section 110 by a throwing wheel 111. The particular construction of barrel section 110 is very similar to that shown and described in U. S. Letters Patent No. 2,441,578, granted May 18, 1948, and of No. 2,574,867 referred to previously, and need not be further described. After transit through section 110, the treated articles become deposited upon the conveyor 130 and are carried by the same laterally of the conveyor into the open mouth of barrel section 115, due to the tumbling and sliding effect imparted to the articles by barrel section 110, where they are subjected to a second stream of abrasive from throwing wheel 112. The speed of progress of the work articles from out of tumbling barrel 110, laterally of conveyor 130, and into the open mouth of barrel section 115 is great enough to cause substantially all of the work pieces to tumble and roll approximately ⅓ of the length of the barrel unimpeded, whereby any piling up or jamming of the work is prevented.

The construction of barrel section 115 is better illustrated in Fig. 5 of the drawings where the same is shown in a horizontal, broken-away section view along the axis of the apparatus. Barrel section 115 includes a pair of adjacent cover shells 160 and 161 which may be detachably but fixedly connected together in any desired manner, as by bolting, or the like. The respective shells are provided with a plurality of adjacent annular liner strips 162 through 167 inclusive which are made as wear resistant replaceable units, the liner strip 167 also constituting an extension of shell 161 as an article shakeout drum through which the finished work is discharged. The second liner strip 163 carries a radially inwardly directed deflector flange 169 extending about the inner periphery of the cylinder and serves to block passage of high speed work articles and slow the same down in order that they may receive a flowing and effective cleaning action by the abrasive stream.

It has been found that prior constructions which permitted the work to proceed directly into a second tumbling barrel after having acquired substantial inertia from a previous tumbling treatment often resulted in an incomplete cleaning of the same. The annular baffle member 169 prevents this by causing the major portion of the work to become lodged on the front side of the baffle in contact with liner member 162 and the forward portion of liner 163 and to lie there for a period of time sufficient to enable a complete treatment of the surfaces of the same by the abrasive stream before the work is tumbled into contact with the end seal helicoid 184.

The inclusion of baffle 169 has brought about a change in the mean average height of the work as it is progressively fed towards the end seal within the barrel, and also to orient or shape the work path in such manner that the articles follow an inclined path towards the interior of the barrel. This is shown more clearly by the dash lines X—X and Y—Y in Fig. 5. Line X—X indicates the mean average height and mean path of the work in baffleless prior tumbling barrel constructions, while the dash-dot line Y—Y represents the arrangement of the work brought about by the inclusion of baffle 169, as well as the mean path which the work follows in progressing towards the interior of the barrel. In the present arrangement, the work is caused to pile up in the front portion of the tumbling barrel in such manner that the uppermost work pieces in the pile will gradually slide laterally downward towards the lower portion of the barrel and to the other or inner side of the baffle 169 into contact with the end seal member. This permits the introduction of new work pieces from the conveyor into the barrel along the lowermost floor portions thereof while the previously treated pieces are carried upwardly with the rotation of the barrel and tumbled onto the top of the newly received work. At this time succeeding work which is being continuously fed into the mouth of section 115 from conveyor 130 will impinge upon the falling and partially treated article to cause it to move laterally on the other side of baffle 169 into contact with liner 163 and thence 164, etc.

Other work articles may become impacted upon the inner edge of the annular baffle and caused to flop over into liner 163. The impact force will normally be sufficient to decelerate the articles and prevent the same from proceeding immediately onto liner section 164 or 165. Articles which have become so positioned in contact with liner 163 will thereafter be carried by the same around and upwardly with the rotation of the barrel section during which they will be subjected to the cleaning action of the abrasive stream by reason of reflected abrasive particles.

Baffle 169 is removably secured to liner member 163 as by means of angle brackets 169' which may be screwed or bolted to the same. In either case the arrangement is such that the baffle member may be readily removed from the barrel and replaced with a like baffle of a smaller or larger radial dimension. The interchangeability of the present construction makes it possible to incorporate the proper baffle having the most efficient cooperation with work articles of a particular size whereby incomplete or excessive cleaning action is prevented. This in turn permits the continuous tumbling mill to be used as a general utility cleaner obviating the necessity of providing separate and distinct sized mills for various types of work.

In some cases it may be desirable to eliminate the baffle arrangement entirely. In practice, this normally occurs after the mill has been in operation for a relatively lengthy period and results from the fact that the continuous impingement of the abrasive particles upon the interior of the liner member surfaces, hardens the liners to such an extent that the same reflect impacting abrasive with substantially little loss in velocity, whereby the effective cleaning action of a single flying abrasive particle is increased greatly. This in turn permits an increase in the feed rate of the work passing through the mill and in many cases eliminates the necessity for any obstruction to insure that the work remains in the tumbling unit for a period sufficiently long enough to obtain a complete cleaning.

A deflector member 182 is positioned centrally of the tumbling unit and carried by a hollow shaft structure 181. Deflector 182 is made of normally elastic material such as rubber and serves to block progress of the abrasive particles along the center of the unit. Deflector 182 is secured to the end of shaft 181 by means of a center plate 182' which may be formed of tempered steel. The arrangement is such that that portion of the abrasive stream, which is directed centrally of the drum, impinges upon plate 182' or deflector 182 and is deflected upon the articles lodged behind baffle 169 in contact with liner 163. The deflector also serves to block progress of any high speed work articles which may follow a central path of movement into the tumbling unit without being slowed down by the action of baffle 169. In practice, this centrally positioned deflector arrangement has proven unexpectedly effective in increasing the life of the end seal structure 180.

The liner members 164 through 167 inclusive are provided with spaced cleat members 170, 171, 172 and 173, respectively, which project radially upwardly from the floor of the unit and function to lift the work articles as the cylinder structure rotates to cause them to be tumbled. A primary function of the various cleat members is to insure a complete separation and release of the abrasive and loose detritus trapped in the various configuration openings and pockets of the work articles. As will be apparent from an inspection of the figure, the leading set of cleats 170 are relatively few in number and spaced about only a portion of the annular extent of liner 164, whereby they may upset the work articles as they progress laterally across liner 164 and yet permit the same, after tumbling to loosen detritus, to lie on the uncleated portion of the liner to again allow at least one face thereof to be retreated by the abrasive stream. On the other hand, liner sections 165 and 166 have closely spaced cleats about the whole of their internal peripheries. It is during passage through these latter liners that the work is subjected to the most intense tumbling action. The final set of cleats in liner section 167 are few in number and widely spaced and merely serve to remove resettled dust and detritus.

In order to assist in separating the work from the abrasive and loosened detritus, each of the liner sections is provided with a plurality of perforations 175 through which the abrasive and loosened detritus may drop out of the tumbling unit into the bottom of the apparatus where it will be collected in the V-shaped trough 102, and carried by a longitudinal conventional screw type conveyor structure 195 to a cross screw conveyor 196 and then to the elevator 107, and subsequently, to the separator unit 106. The outer shells 160 and 161 also include perforated openings 177 which are aligned with the openings 175 in the central liners for cooperation therewith in the manner described.

Shell structures 160, 161 each include an exterior tire member 174 which may be fixed thereon in any conventional manner as by welding, etc., and which serves as a friction drive band for the barrel unit. Tires 174 mate with a pair of friction drive rollers 176 carried by a shaft structure 179 driven by the motor and speed control unit 108. Preferably shaft 179 comprises a single drive shaft from which both barrel sections and both conveyor units may be driven, the sprocket 121 (see Fig. 2) being affixed to shaft 179 in a known manner. In like manner the drive structure for sprocket 122 (see Fig. 2) may also comprise a second shaft which duplicates the elements carried by and functions performed by shaft 179 at a substantially diametrically opposite portion of the tumbling assembly.

The centrally disposed shafting structure 181, 185, which supports the deflector plate 182, forms part of a helix, or helicoid-type, end seal similar to that described in my said prior patent and which comprises a series of widely spaced helix turns 184 and 188. The helix turns are spaced sufficiently far enough apart to allow for free passage therebetween of the largest work piece the machine is designed to treat. In accordance with the improvement of the present invention, the helix sealing structure is formed in separate sections 184 and 188, respectively, the forward section 184 being carried by the hollow supporting shaft 181, and the rearward section 188 being carried by the rear hollow shaft section 185, the respective helices being secured to the shaft sections by welding.

As shown, the helix 184, 188 comprises approximately 3½ turns total of which two full turns, comprising helix 188, are carried by shaft section 185 and 1⅜ turns, comprising helix 184, are carried by shaft section 181. Dividing the shaft sections and the helix structure into two separate parts provides obvious and distinct advantages in both the manufacturing and maintenance of the unit. The helix section 184 is further provided on its front face with a wear-resistant padding 190, which extends about the full length of the helix section and onto a portion of the rear helix section 188 in the manner illustrated in the figure. This protective covering has proved unexpectedly effective in eliminating frequent repairing and replacement of the apparatus parts, including the liner sections 162 through 166 inclusive, and has extended the life of the helix section 184 approximately threefold.

Each helix section is formed by building up wedge-shaped segments constitutnig a portion of a turn, and which are secured together to form an integral screw thread by bolting, welding or the like joining procedure. Preferably, the separate shaft sections are each provided with a built-up helix prior to being introduced into the tumbling barrel. Thereafter the outer rim portions of the helix thread in each section is fixedly secured to the drum liner members by seam or spot welding. The helix sections are such that when the tubular shaft sections 181, 185, are placed together in end-to-end alignment, the trailing edge of the helix thread 184 coincides with the forward edge of the helix thread 188. The abutting thread edges, however, are not fixedly secured together but are preferably left in free friction contact for a purpose hereinafter explained.

The forward shaft section 181 is also provided near its rear end with an internal web or flange member 183 through which is formed an axial perforation. A conventional threaded nut member 192 is mounted on web 183 in coaxial alignment with the central perforation and is permanently secured to web 183 as by welding or the like. A further internal web section 186 is positioned centrally of the hollow shaft section 185 adjacent to its forward end in spaced opposed relationship to web 183 and in alignment with a further internal web member 187 near the rear end of shaft 185. Webs 186 and 187 also include axial perforations. Webs 183, 186 and 187 are adapted to provide a free sliding support for an elongated bolt 189 which is threaded at its forward end as shown for cooperation with nut 192.

Bolt 189 is provided at its rear end with a configurated head 191 which may be formed from a threaded nut permanently affixed to the bolt body as by welding, splining, or a similar operation. Head 191 is adapted to abut against the rear web structure 187 in shaft 185 and to push against the same as a limit stop when the bolt has been threaded fully into nut 192. The bolt also carries a second abutment member 192 comprising a washer or the like element permanently secured to the bolt body in spaced relationship to the head 191 on the opposite side of web 187; the arrangement being such that movement of the bolt member to either the left or right, as viewed in the figure, will carry hollow shaft section 185 with the bolt through the intermediate linking action of internal web 187.

The previously described construction is used to make the shake-out drum 167 readily detachable from shell 161. Due to the extended life accorded the component parts mounted within the drum shell 160 and the forward portion of the end seal structure 184, 190, by the specific constructional innovation previously described, it has been found that the shake-out drum 167 suffers the greatest wear and must be replaced more frequently than the other components. This has often been difficult in actual practice due to the wedging of liner 167 within the trailing edge of drum shell 161 under the effects of warpage, heat-induced distortion, accumulations of detritus and abrasive particles, etc. In fact, in some cases it has been virtually impossible to separate the shake-out drum from the shell without dismantling the entire structure. The present construction completely overcomes this difficulty by providing the jacking screw 189 which upon being retracted from threaded engagement with nut 192 carries shaft 185, helix seal section 188, and liner 167 rearwardly to withdraw the entire assembly from drum shell 161. This has completely eliminated any need for dismantling the tumbling barrel from the machine for such type replacement and permits such repair to be accomplished easily and speedily. It will be apparent that the presence of the threaded bolt 189 also serves as a rapid indexing or center aligning medium during assembly of the barrel unit, which may be availed of to draw the separate shaft sections and concentric liner members into firm abutting engagement.

One of the primary advantages of the divided helix construction is the ease and facility with which the supporting shaft sections 181, 185 may be separated from each other to implement the replacement of the wear pad 190 on helix section 184. When it is desired to make such replacement, it is only necessary to turn the configurated head 191 on bolt 189 to withdraw shaft section 185 and its supported helix section 188 with the attached concentric liner 167 from within shell 161. Thereafter shell section 160 may be separated from shell 161 and axially separated from the same by disconnecting the bolts, screws, or other securing means used to maintain liner 164 within shell 160. After this operation, shell 160 with its included liners 162 and 163 may be separated from shell 161 leaving the latter shell with annular liner members 164, 165 and 166 and helix section 184 fixed therein. Since helix section 184 comprises less than two full turns, it is a simple matter for a workman to remove the worn padding 190 from the helix and to replace it with a new one. To facilitate this, the padding may be formed as a segmented unit, which may be secured to helix 184 as by bolts, screws, or the like connecting means. It will thus be seen that it is never necessary to remove helix 184 from within the liner members 164, 165 and 166 until and unless the helix itself has become substantially deteriorated. This is likely to occur in only a few instances during the useful life of the mill. It will further be apparent that the ready separability of the several components also facilitates the replacement of the liner members, the renewal of liners 164 and 166 being substantially as easy to accomplish as the renewal of liners 162 or 163 by virtue of the fact that the weld connection between the periphery of the helix and the liner surface is readily accessible, even with the liner and helix in position within shell 161, thus permitting the same to be severed readily.

This constitutes a decided improvement over the prior constructions, such as that shown in Fig. 4 of my previous patent, above identified, wherein it is necessary to remove the entire helix structure from within the liner members to repair or replace the same. With the present construction, however, it is even possible to remove the wear padding 190 from section 184 without removing the helix from the concentric liner members 165 and 166, to which the helix is fixed as by spot or tack welding.

Another important advantage of the present improvement will become apparent from reference to Fig. 5 wherein the helix end seal is shown as terminating with its front face projecting only a small distance into shell 160 (approximately one-half of the width of liner 164) and leaving a free threshold area of slightly less than one-fourth of the length of the entire drum unit. The relatively large unblocked space thus provided in shell 160 positively precludes any chance of having the work pile up on the conveyor 130 or ricochet off of helix 184 or deflector 182 back onto the conveyor.

This in turn has produced a secondary advantage in that the throwing rate of wheel 112 and the rotary speed of barrel 115 and conveyor 130 may be increased substantially to effectively increase the work rate without reducing the effectiveness of the cleaning action. The retraction on helix section 184 from the front edge of shell 160 in combination with the protective padding 190 and resilient deflector 182 have also substantially eliminated work breakage without detracting from the cleaning action.

From the foregoing description, it will be apparent that helix 184, 188 constitutes a sealing end shake-out member which separates the cleaned work pieces from the detritus while simultaneously preventing escape of the blasting particles from the apparatus in the same manner as is disclosed in my said prior patent. The present construction, however, provides specific and distinct additional improvements in the manufacture, maintenance and function of the device, as previously described, while also increasing the life and output of the apparatus far beyond that experienced with prior constructions. It should be particularly noted that these distinct advantages result, not from the isolated features alone, but from the active cooperation of the same when associated together in the manner described.

It will further be apparent that the improved construction of the work feeding section of the apparatus also provides an effective end seal for preventing the escape of detritus blastant particles, while at the same time obviating the possibility of such material becoming clogged or jammed between the relatively moving parts of the feeding structure. The particular improved feeding structure employed cooperates with the improved final tumbling barrel and end seal construction 115, in effectively increasing the put-through rate of the apparatus, and specifically in providing means for accommodating the emptying of bulk work, as for example, by carload lots, into the feed hopper with a consequent progressive and systematic piece-by-piece feeding of the same to the tumbling barrel section 110 at a rate which was unattainable with prior gravity-feed arrangements. This has permitted a realization of the greatest possible operation speed in both barrel sections and both throwing wheels, with an obvious economy.

The spent abrasive particles and loosened detritus will gravitate towards the lower portions of the respective barrel sections, where they will escape through the perforations previously described into the lower collector chamber 102 of the apparatus and thence into the longitudinal screw conveyor 195. Conveyor 195 in turn feeds the collected particles to a transverse screw conveyor 196, which in turn carries the same to elevator 107 for subsequent processing by separator 106 in a manner well known in the art. The fully treated and cleaned work pieces will be discharged from the shake-out end 167 of barrel section 115 to any suitable collecting unit (not illustrated).

A modified form of rotating baffle structure for the feeding section is illustrated in Fig. 9 of the drawings in which like reference characters denote like parts. As shown, the rotating baffle 225 is constructed identically with that illustrated in Fig. 4 with the exception that instead of having a frusto-conical shape, it has a conventional conical configuration. In actual practice, this change is also accompanied by a change in the generating angle to provide a flatter slope for the conical sides. The baffle member is positioned over the idler stub shaft 226 and fixed thereon by a center plate 224 in a manner similar to that described previously with respect to the Fig. 4 construction.

One of the primary advantages of such construction is that it effectively increases the speed of the separating action in segregating individual work pieces from a jumbled mass of the same on conveyor 220 and directing the individual pieces to the axial center of the barrel 210 with a higher trajectory than is possible with the sharply sloped baffle of Fig. 4. The action of this type baffle plate has proven very successful in introducing the work into the tumbling barrel as an orderly progression of separate items. For this reason it is particularly advantageous when relatively small articles are to be treated.

It will be appreciated by those skilled in the art that although the present invention is particularly and distinctly effective in cooperation with a pair of aligned tumbling barrel structures into which abrasive particles are thrown in opposed directional relationship, the same or any part thereof may be applied to other known cleaning and blasting apparatus, as for example, that employing three barrel sections and a pair of uni-directional abrasive throwing wheels (similar to the construction shown in my said prior patent). Alternatively, the invention may be applied to abrasive cleaning apparatus employing only a single abrasive throwing wheel located between a pair of tumbling barrel constructions.

These alternative arrangements may be constructed in the manner hereinafter described. A modified form of the invention is illustrated in more or less diagrammatical form in Figs. 10 and 11 of the drawings. As shown in the figures, this form of the invention comprises the use of a single tumbling drum which preferably is constructed in accordance with the improvements previously specifically defined and cooperates with the improved work feeding arrangement in such manner as to provide an extremely compact unit. As shown, the continuous mill includes an enclosure housing generally denoted as numeral 300 which supports and substantially encloses a tumbling barrel 315, abrasive throwing wheel 311, an end baffle member 325, a conveyor bridging means 320 and a work feed chute 313, in like manner to the support of the similar components in the previously described embodiments. In this form of the invention, however, housing 300 includes a single inclined collector plate 302 which extends from one sidewall diagrammatically downwardly towards the other sidewall where it terminates in juxtaposition with a screw type conveyor 395. Collector plate 302 functions for the same purpose as the plate 102 in the Fig. 1 embodiment and serves to direct separated detritus and abrasive particles as they emerge from tumbling drum 315 or from the articulated conveyor means 320 downwardly to the screw conveyor 395. The screw conveyor carries the collected detritus and abrasive to a transverse conveyor 396 which deposits the same in a conventional bucket type elevator structure 307 in like manner to the arrangement specifically described with respect to Fig. 1 of the drawings. In the present form of the invention, the collection of the separated abrasive and detritus is facilitated in the region of the bridging conveyor by interposing an inverted V-shaped baffle structure 323 in the gap between the working and non-working links of the conveyor mechanism. The baffle structure is so arranged that it will collect spent abrasive and detritus which may be dropped through the articulated links of the conveyor and carry the same laterally to either side of the conveyor girth before depositing it onto the collector plate 302. This construction has proven of substantial value in keeping the conveyor in good working order and free from breakdowns due to jamming and wear of the many fulcrum parts used.

The operation of this form of the invention will be readily understood from an inspection of the drawings but may be described briefly as constituting a continuous cleaning system in which work articles are fed to the feed chute 313 by a conveyor 400, the articles sliding down the inclined floor of the feed chute onto the rotating surface of the end baffle plate 325, and then off of baffle 325 onto the moving conveyor 320, and thence laterally into tumbling drum 315, all in a manner similar to that previously described. The present arrangement, however, provides an unexpected advantage in that the direct feed of the work articles onto the inclined and rotating surface of baffle 325 serves to impel the work articles towards the moving conveyor chain 320 along a skewed path with a twisting moment. The articles so activated, impact upon the conveyor with a direction of movement which is opposite to the direction of movement of the conveyor surface. This serves to bring about a vibrating and tumbling of the work as it settles on the conveyor surface with the result that relatively free surface scale, coarse sand, etc., are immediately freed and shaken off. Thereafter as the work progresses laterally towards the mouth of tumbling drum 315 and into contact with the abrasive stream from the throwing wheel 311, the effect of the abrasive is enhanced and the necessary cleaning time shortened. Although it admittedly is true that the small amount of surface scale, sand and the like which are removed prior to the entrance of the work article into the abrasive stream is of minor or inconsequential effect if viewed alone, this does not hold true when cognizance is taken of the fact that in a continuous operation the added incremental amounts of such excess refuse material which would normally be carried into the path of the abrasive stream within the confines of tumbling drum 315 have a pronounced effect in reducing the effectiveness of the abrasive by acting as a cushion which absorps much of the energy of reflected abrasive particles without producing any useful results, thus unnecessarily increasing the time and amount of abrasive shot required to perform a complete cleaning operation. The savings produced by the present construction will become apparent from the fact that the quantity of work handled by a typical mill of the instant construction averages approximately 7 to 8 tons an hour.

Further modifications of the invention are illustrated in diagrammatical form in Figs. 12 and 13. As shown in Fig. 12, the continuous tumbling mill may comprise an alignment of cooperating component structures which are substantially identical to those described previously and which are indicated by like numerical subscripts in the drawing. In this form of the invention only one abrasive throwing wheel 511 is used, all other components (feed chute 513, baffle 525, conveyor 520 and drums 510 and 515) of the device being substantially identical, with the exception of size, to those illustrated in Fig. 1. This construction is particularly intended for use with small work articles having few hidden or undercut configurated surfaces.

The arrangement shown in Fig. 13, on the other hand, is primarily intended for heavy duty work in processing work articles having complicated contours, independent of whether the same are relatively large or small. In this figure, the equivalent components of the mill are also denoted by like numerical subscripts and comprise a generally conical end seal member 625, a feed chute 613, an endless link type conveyor as the flexible bridging means 620, a first rotary tumbling drum 610, a first abrasive throwing wheel 611, a second endless bridging means 640, a second tumbling mill 650, a second abrasive throwing wheel 612, a third endless bridging means 630, and a final tumbling mill 615, are in a manner similar to the mill disclosed in my said prior patent. It will be noted that in this case the abrasive throwing wheels 611 and 612 are both oriented to face into their respective barrels 610 and 650 and that no abrasive is directly introduced into the final tumbling barrel 615. In view of this, the helicoid end seal member 680 is constructed to extend substantially the entire length of barrel 615 in a manner similar to that described in said prior patent, it being understood, however, that the specific construction of the end seal member conforms to that described for the end seal of Fig. 1. It will further be appreciated that the final tumbling drum 615 may thereby include only one outer shell, similar to 161 of Fig. 1.

Another modified form of the invention is also shown in diagrammatical form in Fig. 14 of the drawings and in which the concurrent tumbling and blasting action is obtained without a rotating tumbling drum. In this form of the invention, a pair of abrasive throwing wheels 711 and 712 are mounted in spaced longitudinal step relationship within an elongated tunnel-like enclosure 700. The respective wheels are arranged to direct the stream of abrasive particles towards shaker conveyor 720. The conveyor is arranged to move from right to left as viewed in a substantially continuous manner directly beneath the respective throwing wheels and is adapted to receive new work from a feed chute at one end of the tunnel-like enclosure and to carry the same through the abrasive streams while jostling and vibrating the same. The arrangement is such that as the work traverses the length of the tunnel, the conveyor shakes and tumbles it to present all surfaces to the abrasive stream and to shake off the detritus and spent abrasive. After treatment it is dropped off the trailing end of the conveyor 720 onto a second transverse conveyor 780. This is accompanied by flipping or flop-over action imparted to the work by resilient baffles 769.

The conveyor 780 carries the treated and cleaned work to a discharge point. The abrasive and detritus separated from the work is collected from conveyor 720 by an inclined collector plate 702 and from conveyor 780 by an inclined collector plate 702'. These plates discharge into a pair of screw conveyors 795 and 796 which transfer the collected abrasive and detritus to a conventional separator. Preferably a deflector baffle 723, similar to baffle 323 in Fig. 10, is disposed beneath conveyor 720.

It will be appreciated that the present arrangement permits the continuous introduction of work onto the shaker conveyor at the feed end of the tunnel without any danger of the same becoming piled up or jammed. At the same time, the work will be progressively fed through the abrasive streams while being continuously agitated and tumbled about due to the shaking action of the conveyor whereby all facets, corners and the like of the configurated upper surface of the work will be processed by the abrasive stream. This continuous jiggling of the work as it progresses through the abrasive stream precludes entrapment of the inert detritus or abrasive particles within the grooves, cavities and the like in the work, while simultaneously changing the relative orientation of the work to the impacting stream of abrasive. Upon being discharged from the shaker conveyor, the work will flip-flop over the baffles 769 to complete separation of any particles of the abrasive stream. These latter particles drop through conveyor 780 on plate 702' into conveyor 796.

The details of the shaker conveyor construction are not shown in the figure, but the same may comprise any of the many well-known structural arrangements for causing shaking and tumbling of the carried articles as the conveyor progressively moves, the present conveyor structure being constructed in a manner similar to that described in U. S. Letters Patent No. 1,141,861. It will be appreciated, however, that the shaker conveyor need not be of the endless belt type and that other types of conveyor structures may be substituted therefor. For example the conveyor 796 may be constructed in a manner shown and described in U. S. Letters Patent Nos. 2,481,131, 2,499,171, or 2,600,401.

As many apparently widely different embodiments of this invention may be made without departing from the spirit and scope hereof, it is to be understood that this invention is not limited, except as defined in the appended claims.

What is claimed is:

1. A continuous blasting mill comprising a tumbling barrel assembly mounted for rotation on the axis thereof, means to discharge a blasting stream of abrasive particles toward workpieces within said barrel assembly, means for feeding workpieces laterally into said barrel assembly including a conveyor provided adjacent one end of said barrel assembly, a workpiece delivery means and a rotatable baffle member adjacent said conveyor, said conveyor and said baffle member being in operative driving relationship with each other and being so constructed and arranged relative to each other that they coact to convey workpieces into one end of said barrel assembly, and a helicoidal baffle coaxially positioned within at least part of said barrel assembly and extending across the full cross-sectional internal area thereof for the purpose of obstructing and preventing egress of rapidly flying particles of abrasive and detritus therefrom.

2. A continuous blasting mill as set forth in claim 1 in which said helicoidal baffle comprises at least two complete turns, the forward edge of which is positioned from the edge of said barrel adjacent to said bridging means by a substantially unobstructed threshold area which is equal to approximately ⅓ of the length of the barrel.

3. A continuous blasting mill as set forth in claim 1 in which said helicoidal baffle comprises at least two separate sections of at least one complete helicoidal turn each and including means extending through the axial center thereof for detachably securing said separate helicoidal sections together within said tumbling barrel.

4. A continuous blasting mill as set forth in claim 1 in which said helicoidal baffle comprises a pair of axially aligned hollow shafts, a helicoidal baffle formed on each of said shafts and comprising at least one complete turn, said helicoidal baffles being oriented with respect to each other so as to form an uninterrupted helix extending across the full cross-sectional area of said tumbling barrel assembly, and means carried within each said hollow shaft section for detachably securing said shaft sections and helicoidal baffles together.

5. A continuous blasting mill as set forth in claim 4 in which the helicoidal baffle structure is positioned within said barrel assembly at a distance from the leading end thereof adjacent to said conveyor, to thereby present a substantially unobstructed threshold zone of a width substantially greater than the largest dimension of any work piece adapted to be treated in the machine.

6. A continuous blasting mill as set forth in claim 4 in which one of said helicoidal baffles is covered with a replaceable protective padding of a relatively elastic nature.

7. A continuous blasting mill as set forth in claim 4 in which one of said hollow shaft sections includes a second baffle structure comprising a relatively elastic plate positioned centrally of said barrel assembly in front of said helicoidal baffle and adapted to block passage of wild, flying abrasive particles and work pieces.

8. A continuous blasting mill as set forth in claim 1 in which said feeding means further comprises a feed chute including an inclined floor and a floor covering of a relatively elastic nature, said floor being positioned above said conveyor and so oriented as to direct work pieces thereon by gravity.

9. A continuous blasting mill as set forth in claim 8 in which said feed chute further includes a vertically depending curtain member blocking passage between said inclined chute and said conveyor and adapted to be contacted by the work pieces as they are fed down the surface of said inclined floor to slow the speed of the same.

10. A continuous blasting mill as set forth in claim 1 in which said abrasive blasting machine comprises a pair of coaxial tumbling barrels and a pair of airless blasting units, one of which is adapted to direct a stream of abrasive particles into one of said coaxial tumbling barrels, and the other of which is adapted to direct a stream of abrasive particles into the other of said coaxial tumbling barrels.

11. A continuous blasting mill as set forth in claim 1 in which there is provided in said second barrel assembly a plurality of annular wear pads removably mounted therein in side by side relationship, one of said removable wear pads including a short inwardly radially extending annular baffle.

12. A continuous blasting mill as set forth in claim 11 in which said annular baffle is positioned intermediate said helicoidal baffle and the edge of said barrel assembly which is adjacent to said conveyor.

13. In a shake-out drum for a work blasting machine, a drum cylinder, a plurality of annular liner members removably mounted within said drum cylinder in side by side relationship therein, a helix mounted within said drum and comprising a plurality of sections of at least one complete turn, said helix sections being mounted on a hollow shaft member comprising a plurality of shaft sections each of which corresponds to one of the helix sections, means extending through said hollow shaft member for connecting said helix sections in fixed aligned relationship, said drum including an unobstructed threshold zone immediately in front of said helix structure of a width equal to approximately ⅕ of the length of said drum, one of said wear pads including a radially inwardly directed annular baffle which substantially bisects said threshold zone, said helix extending substantially across the entire cross section of said drum and providing an obstruction to the egress of flying abrasive particles, detritus and work pieces.

14. In a continuous blasting mill in combination with a rotatable tumbling barrel, a generally conically shaped baffle member positioned coaxially with said tumbling barrel in spaced relationship thereto, said baffle member presenting the apex of its conical configuration toward said tumbling barrel, and a bridging member spanning the gap between said tumbling barrel and said baffle member and comprising a flexible endless conveyor, means mounting said conveyor to move contiguously about a portion of the rim of said tumbling barrel and said baffle member.

15. The combination as set forth in claim 14 in which said bridging means contacts said baffle member to frictionally drive the same in synchronous relationship with movement of said bridging means.

References Cited in the file of this patent

UNITED STATES PATENTS

| | | |
|---|---|---|
| 1,702,759 | Barber | Feb. 19, 1929 |
| 1,882,443 | Peik | Oct. 11, 1932 |
| 1,934,461 | Hartley | Nov. 7, 1933 |
| 2,058,257 | Porteous | Oct. 20, 1936 |
| 2,131,771 | Turnbull | Oct. 4, 1938 |
| 2,274,891 | Dysthe | Mar. 3, 1942 |
| 2,441,578 | Keefer | May 18, 1948 |
| 2,457,461 | Graae | Dec. 28, 1948 |
| 2,563,084 | Turnbull | Aug. 7, 1951 |
| 2,574,867 | Gladfelter | Nov. 13, 1951 |
| 2,617,545 | Campbell | Nov. 11, 1952 |